(12) United States Patent
Pierret et al.

(10) Patent No.: US 6,400,125 B1
(45) Date of Patent: *Jun. 4, 2002

(54) DEVICE FOR REGULATING THE VOLTAGE AT WHICH AN AUTOMOBILE BATTERY IS CHARGED BY AN ALTERNATOR

(75) Inventors: Jean-Marie Pierret, Paris; Raymond Rechdan, Saint-Maurice, both of (FR)

(73) Assignee: Valeo Equipements Electriques Moteur, Creteil (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,839

(22) Filed: Dec. 16, 1997

(30) Foreign Application Priority Data

Dec. 16, 1996 (FR) .............................. 96 15421

(51) Int. Cl.[7] ................................ H02P 11/04
(52) U.S. Cl. ....................................... 322/29
(58) Field of Search ............................ 322/20, 29, 31, 322/32

(56) References Cited

U.S. PATENT DOCUMENTS

| 5,079,496 A | * | 1/1992 | Pierret et al. | ................. 322/28 |
| 5,182,511 A | * | 1/1993 | Pierret et al. | ................. 324/545 |
| 5,296,798 A | * | 3/1994 | Pierret et al. | ................. 322/28 |
| 5,323,101 A | * | 6/1994 | Pierret et al. | ................. 322/28 |
| 5,357,186 A | | 10/1994 | Pennisi et al. | ............. 320/128 |
| 5,376,876 A | * | 12/1994 | Bauser et al. | ................. 322/28 |

FOREIGN PATENT DOCUMENTS

| EP | 0 191 571 | 8/1986 |
| EP | 0 519 805 | 12/1992 |

* cited by examiner

Primary Examiner—Nestor Ramirez
Assistant Examiner—Peter Medley
(74) Attorney, Agent, or Firm—Morgan & Finnegan LLP

(57) ABSTRACT

A device for regulating the voltage at which an automobile battery is charged by an alternator, having a control circuit and a power circuit, as well as an external management unit connected to the control circuit in order to transmit different regulation parameters to it, the power circuit also being connected to the external management unit and including means enabling it to generate by itself an excitation signal when the management unit delivers a control signal, the control circuit being activated to emit an excitation signal only when it detects the start of rotation of the alternator.

27 Claims, 3 Drawing Sheets

– Prior Art –

DEVICE FOR REGULATING THE VOLTAGE AT WHICH AN AUTOMOBILE BATTERY IS CHARGED BY AN ALTERNATOR

FIELD OF THE INVENTION

The present invention relates to a device for regulating the voltage at which an automobile battery is charged by means of an alternator.

More particularly, the invention concerns a regulation device which includes—in addition to a regulator proper, which delivers excitation signals to the inductor of the alternator—a management unit external to said regulator and to the alternator, which controls said regulator.

BACKGROUND OF THE INVENTION

For producing such a regulation device, a structure of the type illustrated in FIG. 1 could be considered.

The regulator 1 is composed therein of a control circuit 2 and a power circuit 3, the latter amplifying the excitation signals delivered by the control circuit 2. The amplified excitation signals are applied to the inductor 4a of the alternator 4 (the rotor) in the form of a voltage Vex causing an excitation current Ies in said inductor 4a.

The control circuit 2 is connected, by means of a wired connection 6, to a computer 5—for example that of the engine control—which constitutes the external management unit of the device.

With such a device, the regulation function is activated by the signal transmitted to the control circuit 2 by the computer 5—via the connection 6. This signal is for example a signal of the type referred to as pulse width modulation or PWM.

The control circuit 2 is then activated and transmits a pre-excitation signal to the power circuit 3. The alternator 4 is consequently magnetised, so that the rotation of the alternator generates a phase signal (a voltage at the terminals of one of the windings).

As soon as the control circuit 2 has detected this phase signal, the pre-excitation signal is transformed into an excitation signal in order to regulate the battery voltage.

However, such a structure is not fully satisfactory.

The connection 2 may be subjected to electromagnetic interference caused by equipment internal or external to the vehicle (a radio telephone for example). Such interference is liable to produce, at the terminals of the connection 6, overvoltages which may activate the control circuit 2 and, consequently, cause a pre-excitation current discharging the battery when the vehicle is stopped. It will be noted in particular that the discharge current may then be greater than 50 mA.

One aim of the invention is to mitigate this drawback and to propose a regulation device of the type which makes it possible to achieve the triggering of the regulator in normal mode and in degraded mode and offers good immunity against electromagnetic interference.

The recommended solution consists of magnetising the alternator circuit by means of an excitation current fixed by the control signal delivered by the external management unit, this control unit directly controlling the power stage of the regulator when the alternator is stopped.

SUMMARY OF THE INVENTION

According to one aspect of the present invention there is provided a device for regulating the voltage at which an automobile battery is charged by an alternator, including on the one hand a control circuit which comprises means for controlling the excitation of the inductor of the alternator as a function of the charging voltage, as well as means for detecting the start of rotation of the alternator, and on the other hand a power circuit which includes means for amplifying the excitation signals which are transmitted to it by the control circuit, said regulation device including an external management unit connected to the control circuit in order to transmit to it different regulation parameters, the power circuit also being connected to the external management unit and having means enabling it to generate by itself an excitation signal when the management unit delivers a control signal, the control circuit being adapted to be activated to emit an excitation signal only when the start of rotation of the alternator is detected.

This device is advantageously supplemented by the following different characteristics taken alone or in all their possible combinations:

- the power circuit includes logic means which are connected to the means of detecting the start of rotation of the alternator, as well as to the external management unit, and which generate an excitation signal, by means of the amplification means, only when the external management unit delivers a control signal and no start of rotation of the alternator is detected;
- the means of detecting the start of rotation of the alternator comprise a circuit for detecting the appearance of a voltage between two phases of the alternator;
- the circuit for detecting this phase signal includes a signal detector which generates a high-level signal when the voltage which corresponds to this phase signal is greater than a given threshold, a timing device which receives the signal output from this detector and which is reset to zero when this signal is at its high level, a logic inverter whose input is connected to the output of the timing device and whose output is connected to a computer in the control circuit;
- the power circuit includes a logic inverter which receives the signal emitted by the external management unit, and a logic NOR gate which receives the output of this logic inverter, as well as that of the logic inverter of the detection circuit;
- the power circuit also includes a logic OR gate which receives as an input the output of said logic NOR gate, as well as the excitation control signal generated by the computer of the control circuit;
- the control circuit and the power circuit includes means for regulating, when instructed by the external management unit, the voltage between two phases of the alternator;
- the logic OR gate also receives as an input a signal generated by the means of regulating the voltage between two phases of the alternator;
- the power circuit includes a second logic NOR gate whose output is sent as an input to the logic OR gate and which receives as an input a signal output from the computer of the detection circuit, as well as a signal output from the means detecting that the phases of the alternator have crossed one or more given voltage thresholds;
- these means of detecting the crossing of a threshold or thresholds include a signal detector which generates a low-level signal when the phase voltages take peak values below a given threshold, a timing device which receives the signal output from this detector and which is reset to zero when this signal is at its high level, a logic inverter whose input is connected to the output of the timing device and whose output is transmitted to the second logic NOR gate.

According to a further aspect there is provided a device for regulating the voltage at which an automobile battery is charged by an alternator, including on the one hand a control circuit which comprises means for controlling the excitation of the inductor of the alternator as a function of the charging voltage, as well as means for detecting the start of rotation of the alternator, and on the other hand a power circuit which includes means for amplifying the excitation signals which are transmitted to it by the control circuit, said regulation device including an external management unit connected to the control circuit in order to transmit to it different regulation parameters, the power circuit also being connected to the external management unit and having means enabling it to generate by itself an excitation signal when the management unit delivers a control signal, the control circuit being adapted to be awakened to emit an excitation signal only when the start of rotation of the alternator is detected, wherein the power circuit includes logic means which are connected to the means of detecting the start of rotation of the alternator, as well as to the external management unit, and which generate an excitation signal, by means of the amplification means, only when the external management unit delivers a control signal and no start of rotation of the alternator is detected, wherein the means of detecting the start of rotation of the alternator comprise a circuit for detecting the appearance of a voltage between two phases of the alternator, and wherein the circuit for detecting this phase signal includes a signal detector which generates a high-level signal when the voltage which corresponds to this phase signal is greater than a given threshold, a timing device which receives the signal output from this detector and which is reset to zero when this signal is at its high level, a logic inverter whose input is connected to the output of the timing device and whose output is connected to a computer in the control circuit.

According to yet another aspect there is provided a device for regulating the voltage at which an automobile battery is charged by an alternator, including on the one hand a control circuit which comprises means for controlling the excitation of the inductor of the alternator as a function of the charging voltage, as well as means for detecting the start of rotation of the alternator, and on the other hand a power circuit which includes means for amplifying the excitation signals which are transmitted to it by the control circuit, said regulation device including an external management unit connected to the control circuit in order to transmit to it different regulation parameters, the power circuit also being connected to the external management unit and having means enabling it to generate by itself an excitation signal when the management unit delivers a control signal, the control circuit being adapted to be awakened to emit an excitation signal only when the start of rotation of the alternator is detected, wherein the power circuit includes logic means which are connected to the means of detecting the start of rotation of the alternator, as well as to the external management unit and which generate an excitation signal, by means of the amplification means, only when the external management unit delivers a control signal and no start of rotation of the alternator is detected, wherein the means of detecting the start of rotation of the alternator comprise a circuit for detecting the appearance of a voltage between two phases of the alternator, and wherein the circuit for detecting this phase signal includes a signal detector which generates a high-level signal when the voltage which corresponds to this phase signal is greater than a given threshold, a timing device which receives the signal output from this detector and which is reset to zero when this signal is at its high level, a logic inverter whose input is connected to the output of the timing device and whose output is connected to a computer in the control circuit, wherein the power circuit includes a logic inverter which receives the signal emitted by the external management unit, and a logic NOR gate which receives the output of this logic inverter, as well as that of the logic inverter of the detection circuit, wherein the power circuit also includes a logic OR gate which receives as an input the output of said logic NOR gate, as well as the excitation control signal generated by the computer of the control circuit, wherein the control circuit and the power circuit includes means for regulating, when instructed by the external management unit, the voltage between two phases of the alternator.

BRIEF DESCRIPTION OF THE DRAWINGS

Other characteristics and advantages of the invention will also emerge from the description which follows. This description is purely illustrated and non-limitative. It must be read in connection with the accompanying drawings in which.

DESCRIPTION OF THE PREFERRED EMBODIMENT

Figure 1:
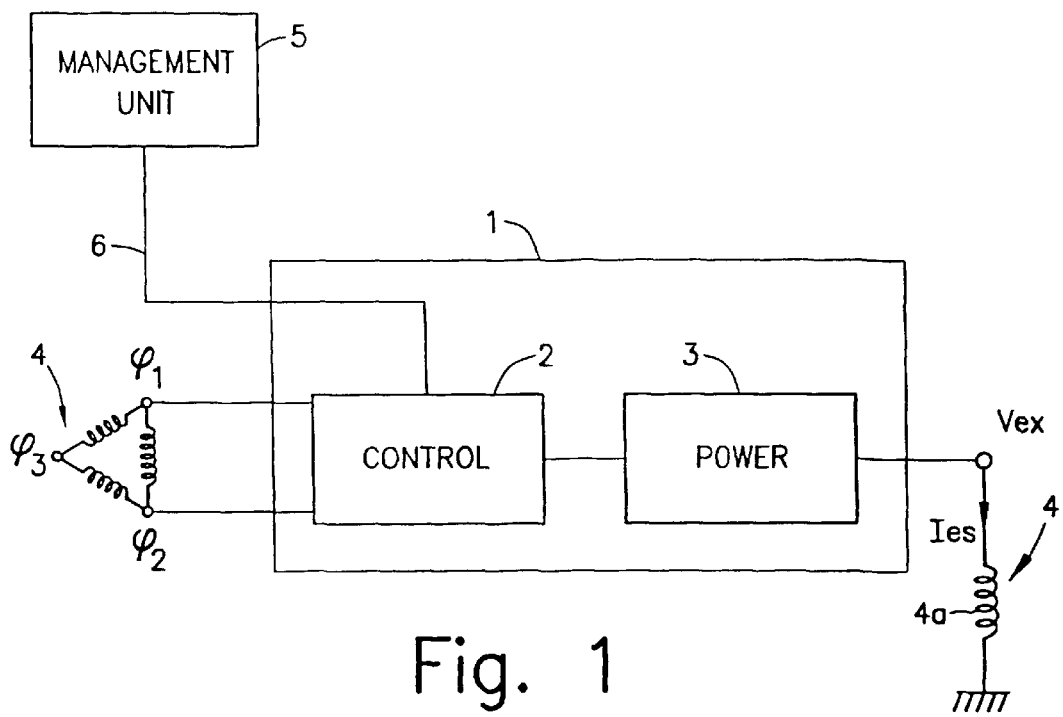
FIG. 1 already analysed, is a schematic representation of a regulation device including an external management unit.

In the description like features are referred to by like reference numerals.

Figure 2:
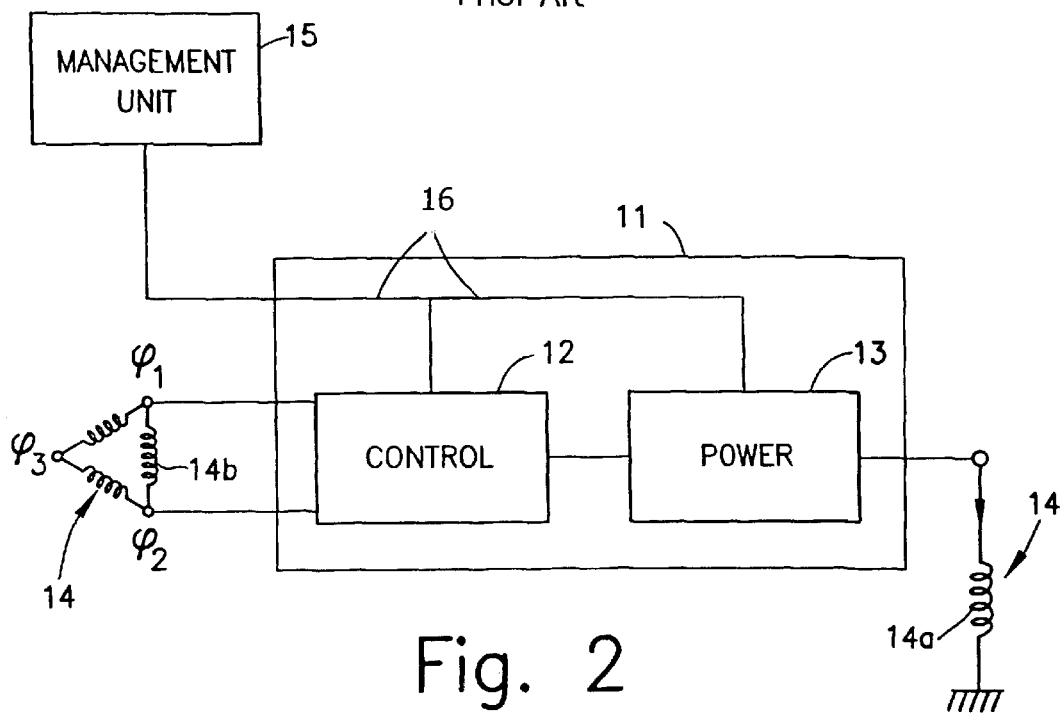
FIG. 2 is a schematic representation of a regulation device according to one possible embodiment of the invention.

The regulation device illustrated in FIG. 2 has a regulator 11, which consists on the one hand of a control circuit 12 receiving a phase signal, which corresponds to a voltage between two phases of the armature 14b of the alternator 14 (inputs $\phi_1$ and $\phi_2$), and on the other hand of a power circuit 13 which delivers an excitation current to the inductor 14a of the alternator 14.

This regulation device also has a management unit 15 which is connected both to the control circuit 12 and to the power circuit 13 (wired connections 16).

Unlike the regulation device of FIG. 1, the signal emitted by the unit 15 is not used to activate the control circuit 12. The power circuit 13, which is directly connected to the management unit 15, generates by itself, on reception of the signal emitted by the management unit 15, an excitation signal which magnetises the alternator.

As for the control circuit 12, this is activated by the appearance of the phase signal between the inputs $\phi_1$ and $\phi_2$, that is to say when the alternator 14 is in rotation—and therefore capable of charging the battery.

Thus an interference passing through the connections 16 cannot activate the regulator and cause a discharge of the battery when the alternator is stopped.

As long as the alternator 14 is not rotating, the phase signal does not exist and the control circuit 12 cannot be activated. An interference creates only a light excitation current (less than 1 mA) incapable of discharging the battery to an appreciable extent.

As soon as the alternator is in rotation and the control circuit 12 is activated, the control circuit 12 emits an excitation signal which is a function of different parameters of the signal emitted by the management unit 15 (frequency, amplitude, cycle ratio etc). Provision can advantageously be made for this signal, during the engine acceleration phase, to be a pre-excitation signal independent of the charging voltage, so as to reduce the torque of the alternator during this phase, the normal regulation of the charging voltage being effected only at the end of this start-up phase.

Figure 3:
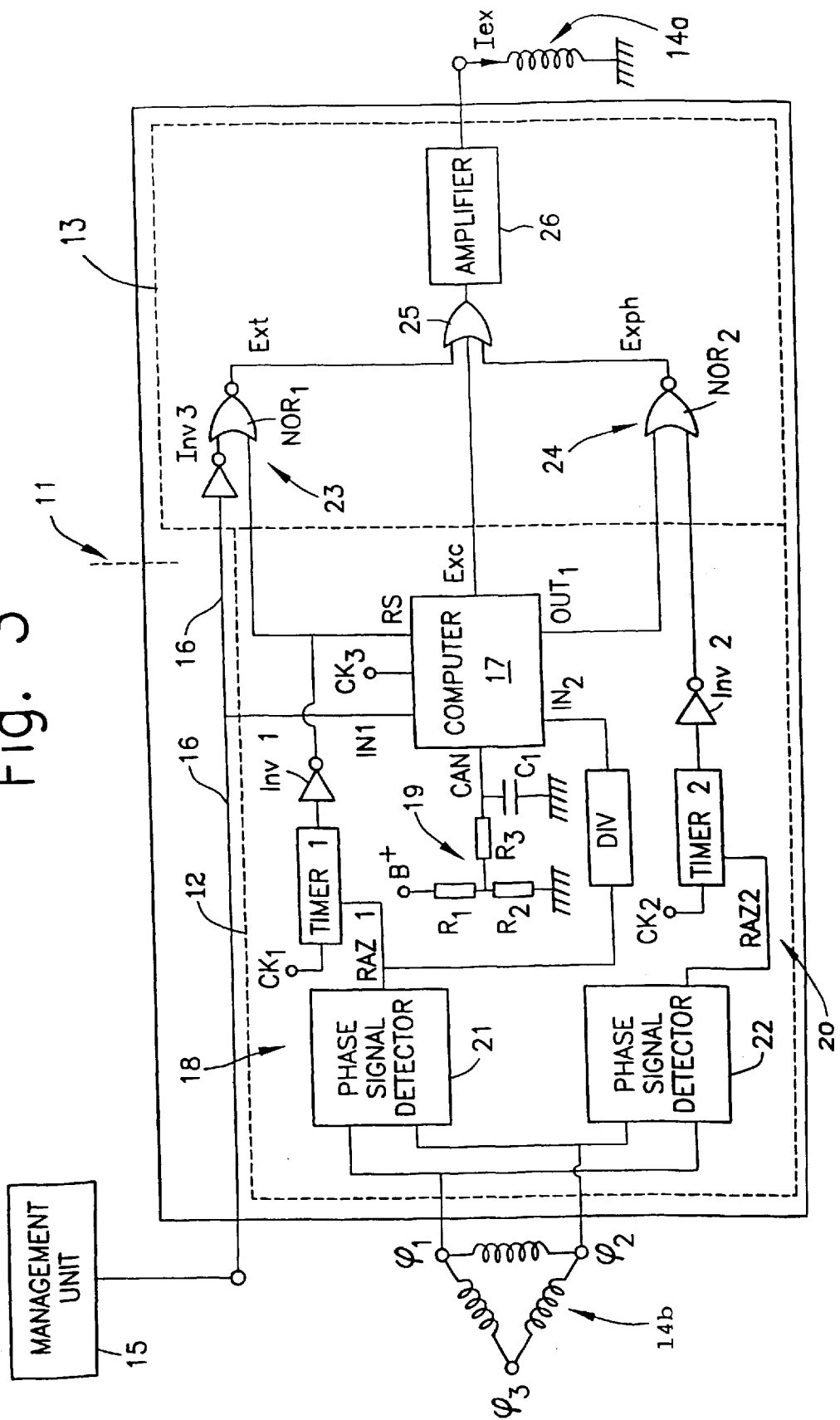
FIG. 3 is a diagram illustrating a possible circuit for a device of the type in FIG. 2.

As illustrated in FIG. 3, in a possible embodiment, the control circuit 12 includes a computer 17, a phase signal detection circuit 18 whose output is connected to an input RS of the computer 17, a voltage filtering circuit 19 which connects the output voltage of the alternator to an input CAN of the computer 17 via a power supply terminal B+, as well as a phase signal regulation circuit 20.

The computer 17 is connected by an input $IN_1$ to the management unit 15 by means of the connection 16.

It also receives a clock signal (input $CL_3$).

The phase signal detection circuit 18 includes a signal detector 21, which is described later in detail with reference to FIG. 4. This detector 21 receives as an input the voltage between the inputs $\phi_1$ and $\phi_2$. It generates a high-level signal when this voltage is above 0.6 volts. The signal $RAZ_1$ output from this detector 21 is sent to a timing device $TEMP_1$ (clock signal input $CK_1$), which is connected in series with a logic inverter Inv1, whose output is itself injected onto the input RS of the computer 17.

A frequency divider DIV is connected between the output of the phase signal detector 21 and an input $IN_2$ of the computer 17.

The filtering circuit 19 consists of a divider bridge (resistors $R_1$, $R_2$ and $R_3$) and a capacitor $C_1$.

The phase signal regulation circuit 20 also consists of a phase signal detector 22 connected to a timing device $TEMP_2$ (clock signal input $CK_2$) in series with a logic inverter Inv2. The phase detector 22 generates a signal $RAZ_2$, which is at a high level when the voltage between the inputs $\phi_1$ and $\phi_2$ is above 7 volts.

The power circuit 13 for its part includes a circuit 23 for validating the signal emitted by the management unit 15, a circuit 24 for validating the phase regulation, a collector 25 for the different excitation signals, as well as a power amplifier 26 which supplies the excitation current Iex to the inductor. This power circuit also includes an amplifier 26.

The circuit 23 includes a logic inverter Inv3 which receives the signal emitted by the management unit 15, and a NOR gate ($NOR_1$) which receives on the one hand the signal output from the inverter Inv3 and on the other hand the signal output from the inverter Inv1.

The circuit 24 for enabling the phase regulation includes a NOR gate (NOR2), which receives as an input on the one hand the signal output from the inverter Inv2 and on the other hand a signal emitted by the computer 17 at an output $OUT_1$.

The collector 25 consists of a logic OR gate which receives the outputs of the gates $NOR_1$ and $NOR_2$, as well as the excitation signal Exc generated by the computer 17.

When the alternator is not rotating, the phase detector 21 does not initiate the timer $TEMP_1$, whose output level remains at 1. The output of the inverter Inv1 remains at zero and the microcontroller 17 is not activated. Thus, when the management unit 15 delivers a signal PWM, the microcontroller 17 takes no account of it. On the other hand, this signal PWM is reconstituted at the output (Ext) of the gate $NOR_1$. At the same time, the output (Exc) of the computer 17 remains at zero since the latter is not activated. For the same reason, the output $OUT_1$ is at level 1, which forces the level 0 at the output (Exph) of the gate $NOR_2$. The only excitation signal available for the amplifier 26 is therefore the signal PWM reconstituted at the output (Ext) of the gate $NOR_1$. Consequently, when the alternator is not rotating, the excitation signal corresponds to the sole signal PWM.

When the alternator starts to rotate, the phase detector 21 detects the presence of a phase signal at the inputs $\phi_1$ and $\phi_2$, and resets the timer $TEMP_1$ to zero. The output of the inverter Inv1 goes to 1, as well as the input RS of the computer 17, which is then activated. At the same time, the output of the gate $NOR_1$ goes to zero. Thus the computer 17 can deliver an excitation signal at the output Exc in order to control the current Iex in the inductor, via the amplifier 26.

In addition, the computer 17 can, as a function of the signal which it receives from the management unit 15, for example when the cycle ratio thereof takes a value in a given range, enable a phase regulation at 7 volts by setting the output $OUT_1$ at the zero level. If the voltage between $\phi_1$ and $\phi_2$ falls below 7 volts, the phase detector 22 does not reset to zero the timer $TEMP_2$, whose output goes to the 1 level, which sets to zero the output of the inverter Inv2. If the output $OUT_1$ is also at zero, the output of the gate $NOR_1$ delivers an excitation signal Exph at the 1 level, which increases the excitation current Iex via the OR gate and the amplifier 26.

The circuit DIV is a frequency divider which enables the computer 17 to use the frequency of the signal more easily as an input parameter. This possibility is used, for example, if the computer has a progressive charging or speed control function, as described notably in the patent FR 2 701 609.

Figure 4:
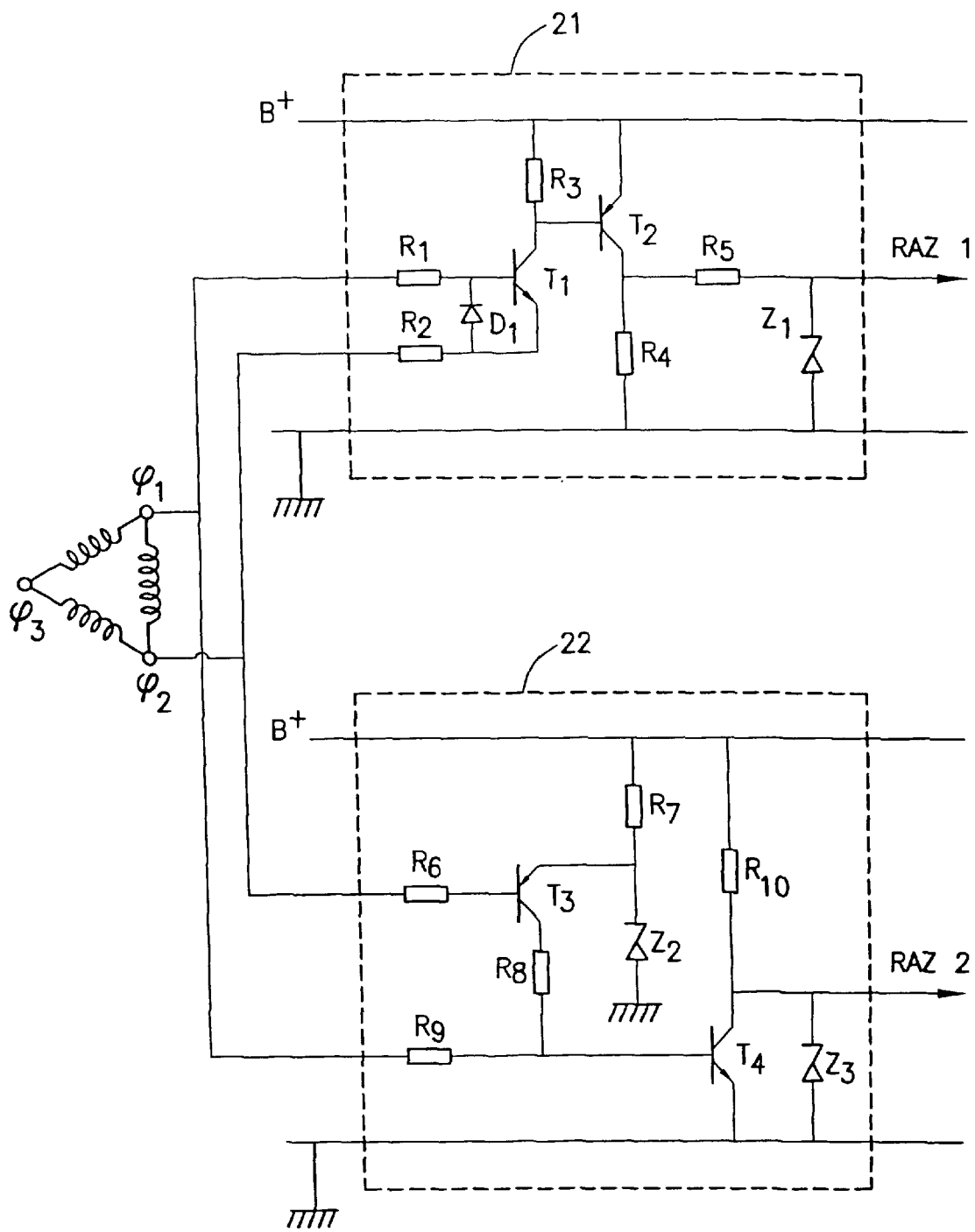
FIG. 4 is a diagram illustrating a possible circuit for the phase signal detectors of the device of FIG. 3.

FIG. 4 illustrates a possible circuit for the phase signal detectors 21 and 22.

In this circuit, the detector 21 has a first bipolar transistor $T_1$ of the npn type, whose base is connected to the input $\phi_1$ through a resistor $R_1$. The emitter of this transistor $T_1$ is connected to the input $\phi_2$ through a resistor $R_2$. A diode $D_1$ is connected between the emitter and the base of this transistor $T_1$. This diode $D_1$ conducts from said emitter to said base.

The collector of the transistor $T_1$ is connected to the base of a transistor $T_2$ of the pnp type, whose emitter is itself connected to a terminal supplying power at the voltage B+ output from the alternator 14. The base of this transistor $T_2$ is also connected to said terminal B+ through a resistor $R_3$.

The collector of the transistor $T_2$ is connected to earth through a resistor $R_4$. It is also connected to a resistor $R_5$ connected at its other end to the cathode of a Zener diode $Z_1$. The signal at the junction point between the Zener diode $Z_1$ and the resistor $R_5$ is the signal $RAZ_1$, which is injected into the timer $TEMP_1$. The Zener voltage of said diode $Z_1$ is 5 volts.

When the alternator is in rotation, the voltage $V\phi_1-V\phi_2$ between the inputs $\phi_1$ and $\phi_2$ takes a positive value greater 0.6 volts, and the transistors $T_1$ and $T_2$ are conductive, so that the signal $RAZ_1$ resets the timer $TEMP_1$ to zero. Conversely, when the alternator is not in rotation, this voltage takes a value below 0.6 volts and said transistors $T_1$ and $T_2$ are non-conductive, so that the detector 21 does not re-initiate the timing.

The circuit of the detector 22 for its part includes a transistor $T_3$ of the pnp type, whose base is connected through a resistor $R_6$ to the input $\phi_2$. Its emitter is connected to the terminal B+ through a resistor $R_7$ This emitter is also connected to earth through a Zener diode $Z_2$, which is conductive from earth to the terminal B+ and whose Zener voltage is 8.5 volts. As for its collector, this is connected through a resistor $R_8$ to the base of a transistor $T_4$, which base is also connected by a resistor $R_9$ to the inpt $\phi_1$. The emitter of this transistor $T_4$ is connected to earth. Its collector is connected to the terminal B+ through a resistor $R_{10}$. A Zener diode $Z_3$ is connected between earth and its collector whilst being conductive from earth to said collector.

The signal output from the collector of this transistor $T_4$ is the signal $RAZ_2$ injected into the timer $TEMP_2$.

Thus, when the alternator is in rotation, this circuit ensures that the phase alternating signal $\phi_2$ passes, at its peaks, a voltage greater than a given threshold, for example 7 volts. This condition ensures the correct functioning of an electronic tachometer equipping the vehicle and connected to this phase output, in particular in the case of a diesel engine.

More precisely, when the voltage at the terminal $\phi_2$ is greater than the voltage of the Zener diode $Z_2$ less the emitter/base junction voltage of $T_3$ (that is to say if it is greater than the value of 7 volts cited as an example), then the transistor $T_3$ is non-conducting. If during this time the voltage at $\phi_1$ is less than the emitter/base junction voltage of $T_4$, (0.6 volts for example), then the latter remains non-conducting. The output $RAZ_2$ is therefore at a logic high level, which signals to the computer 17 that the peaks are passing the threshold of 7 volts and 0.6 volts and that the tachometer can function normally.

If on the other hand one of the aforementioned two conditions is no longer verified, $T_4$ becomes conducting, so that the output $RAZ_2$ goes to the logic low level, which has the effect, as indicated previously, of increasing the current in the field winding of the alternator so that the thresholds of 7 volts and 0.6 volts are once again passed rapidly.

Although preferred embodiments of the invention have been described, it will be understood that the invention is not to be limited to what has been described. Rather the invention extends to the full scope of the appended claims.

What is claimed is:

1. A device for regulating a voltage at which an automobile battery is charged by an alternator, comprising:
   a control circuit including means for controlling an excitation of an inductor of the alternator as a function of a charging voltage and means for detecting a start of rotation of the alternator, the control circuit adapted to be activated and to emit an excitation signal only when the start of rotation of the alternator is detected;
   a power circuit including means for amplifying the excitation signals from the control circuit and means for generating a self-excitation signal; and
   an external management unit, connected externally to the control circuit and the power circuit, for transmitting different regulation parameters to the control circuit when the alternator is running and for delivering a control signal directly to the power circuit when the alternator is not running to cause the means for generating to generate the self-excitation signal.

2. A device as claimed in claim 1, wherein the power circuit include logic means, connected to the means for detecting and the external management unit, for generating the self-excitation signal by the means for amplifying, only when the external management unit delivers the control signal and the start of rotation of the alternator is not detected.

3. A device as claimed in claim 1, wherein the means for detecting includes a circuit for detecting an appearance of the voltage between two phases of the alternator.

4. A device as claimed in claim 3, wherein the circuit for detecting the phase signal includes:
   a signal detector for generating a high-level signal when the voltage corresponding to the phase signal is greater than a given threshold,
   a timing device for receiving the signal output from the detector and for resetting to zero when the signal is at a high level, and
   a logic inverter connected to the output of the timing device and a computer in the control circuit.

5. A device as claimed in claim 1, wherein the control circuit and the power circuit include means for regulating the voltage between two phases of the alternator when instructed by the external management unit.

6. A device for regulating a voltage at which an automobile battery is charged by an alternator, comprising:
   a control circuit including means for controlling an excitation of an inductor of the alternator as a function of a charging voltage and means for detecting a start of rotation of the alternator, the control circuit adapted to be activated and to emit an excitation signal only when the start of rotation of the alternator is detected, the means for detecting including a circuit for detecting an appearance of a voltage between two phases of the alternator, the circuit for detecting including (a) a signal detector for generating a high-level signal when the corresponding voltage to the phase signal is greater than a given threshold, (b) a timing device for receiving the signal output from the detector and for resetting to zero when the signal is at a high level, and (c) a logic inverter connected to an output of the timing device and to the computer of the control circuit;
   a power circuit including means for amplifying the excitation signals from the control circuit and logic means, connected to the means for detecting, for generating a self-excitation signal by the means for amplifying; and
   an external management control unit, connected to the control circuit and the power circuit, for transmitting different regulation parameters to the control circuit and for delivering a control signal to the power circuit to cause the means for generating to generate the self-excitation signal only when the start of rotation of the alternator is not detected.

7. A device as claimed in claim 6, wherein the power circuit includes a logic inverter adapted to receive a signal emitted by the external management unit, and a logic NOR gate adapted to receive an output of the logic inverter of the power circuit and of the logic inverter of the control circuit.

8. A device as claimed in claim 7, wherein the power circuit further includes a logic OR gate adapted to receive the output of the logic NOR gate and the excitation control signal generated by the computer of the control circuit.

9. A device as claimed in claim 8, wherein each of the control circuit and the power circuit includes means for regulating the voltage between two phases of the alternator when instructed by the external management unit.

10. A device for regulating a voltage at which an automobile battery is charged by an alternator, comprising:
    a control circuit including means for controlling an excitation of an inductor of the alternator as a function of a charging voltage and means for detecting the start of rotation of the alternator, the control circuit adapted to be activated and to emit an excitation signal only when the start of rotation of the alternator is detected, the means for detecting including a circuit for detecting an appearance of the voltage between two phases of the alternator, the circuit for detecting including (a) a signal detector for generating a high-level signal when the voltage corresponds to the phase signal is greater than a given threshold, (b) a timing device for receiving the signal output from the detector and for resetting to zero when the signal is at its high level, (c) a logic inverter connected to an output of the timing device and to a computer of the control circuit, a power circuit including means for amplifying the excitation signals from the control circuit, an external management unit, connected to the control circuit and the power circuit for transmitting different regulation parameters to the control circuit and for generating a self-excitation signal at the power circuit when the external management unit delivers a control signal to the power circuit, wherein the power circuit includes a logic means, connected to the means for detecting and the external management unit, for generating the self-excitation signal by the means for amplifying only when the external management unit delivers a control signal and the start of rotation of the alternator is not detected, the power circuit further including a logic inverter adapted to receive a signal emitted by the external management unit, (b) a logic NOR gate adapted to receive the output of the logic inverter of the power circuit and of the control circuit and (c) a logic OR gate adapted to receive the output of the logic NOR gate and an excitation control signal generated by the computer of the control circuit, the control circuit and the power circuit including means for regulating the voltage between two phases of the alternator when instructed by the external management unit.

11. A device as claimed in claim 10, wherein the logic OR gate receives a signal generated by the means for regulating the voltage between two phases of the alternator as an input.

12. A device as claimed in claim 11, wherein the power circuit includes a second logic NOR gate adapted to receive the output from the computer and the output from the means for detecting and having an output which is provided to the logic OR gate, connected to the input of the logic OR gate and adapted to receive the output from the computer of the control circuit and the output from the means for detecting, an output of the second logic NOR gate being sent as an input to the logic OR gate.

13. A device as claimed in claim 12, wherein the means for detecting includes a signal detector for generating a low-level signal when the phase voltages take peak values below a given threshold, the timing device for receiving the signal output from the signal detector and for resetting to zero when the signal is at a high level, and a logic inverter connected to the output of the timing device and to the second logic NOR gate for inverting the signal.

14. An apparatus; comprising:
a control circuit adapted to detect a start of rotation of an alternator and to emit an excitation signal;
a power circuit adapted to amplify the excitation signal from the control circuit and to generate a self-excitation signal; and an external management unit, connected externally to the control circuit and the power circuit, adapted to transmit different regulation parameters to the control circuit when the alternator is running and to deliver a control signal directly to the power circuit when the alternator is not running.

15. An apparatus as claimed in claim 14, wherein the control circuit emits the excitation signal when the rotation of the alternator is detected.

16. An apparatus as claimed in claim 14, wherein the power circuit amplify the excitation signal when the rotation of the alternator is detected.

17. An apparatus as claimed in claim 14, wherein the power circuit generates the self-excitation signal when the external management unit delivers the control signal and the rotation of the alternator is not detected.

18. An apparatus, comprising:
a control circuit adapted to detect a start of rotation of an alternator and to emit an excitation signal, the control circuit emitting the excitation signal when the rotation of the alternator is detected;
a power circuit adapted to amplify the excitation signal from the control circuit and to generate a self-excitation signal, the power circuit amplifying the excitation signal when the rotation of the alternator is detected and generating the self-excitation signal when the rotation of the alternator is not detected; and
an external management unit, connected externally to the control circuit and the power circuit, adapted to transmit different regulation parameters to the control circuit when the rotation of the alternator is detected and to deliver a control signal directly to the power circuit to cause to generate the self-excitation signal when the rotation of the alternator is not detected.

19. An apparatus as claimed in claim 18, wherein the control circuit includes a detecting circuit which has a signal detector to detect a voltage of the alternator.

20. An apparatus as claimed in claim 18, wherein the control circuit includes a regulating circuit which has a signal detector to regulate a voltage of the alternator.

21. An apparatus as claimed in claim 18, wherein the control circuit includes a computer to generate and transmit an excitation signal to the power circuit when the rotation of the alternator is detected.

22. An apparatus as claimed in claim 18, wherein the control circuit includes a frequency divider which enables the computer to select a proper frequency.

23. An apparatus as claimed in claim 18, wherein the excitation signal emitted by the control circuit is a function of different parameters from the external management unit, the different parameters being selected from the group consisting of frequency, amplitude and cycle ratio.

24. An apparatus as claimed in claim 18, wherein the power circuit includes an amplifier to amplify the excitation signal from the control circuit and to generate the self-excitation signal.

25. A method, comprising the steps of:
detecting a voltage of an alternator by a signal detector;
resetting a timer upon receipt a signal which exceeds a threshold voltage of the signal detector;
transmitting an excitation signal generated by a computer when an alternator is rotating;
amplifying the excitation signal by an amplifier when the alternator is rotating;
generating a self-excitation signal by the amplifier when the alternator is not rotating; and supplying the excitation signal and the self-excitation signal to an inductor of the alternator by using the amplifier.

26. A method according to claim 25, wherein the detecting step includes measuring an appearance of a phase signal between two phases of the alternator.

27. An apparatus, comprising:

means for detecting the voltage of an alternator by a signal detector;

means for resetting a timer upon receipt a signal which exceeds a threshold voltage of the signal detector;

means for transmitting an excitation signal generated by a computer when the alternator is rotating;

means for amplifying the excitation signal by an amplifier when the alternator is rotating;

means for generating a self-excitation signal by the amplifier when the alternator is not rotating; and means for supplying the excitation signal and the self-excitation signal to an inductor of the alternator by using the amplifier.

* * * * *